United States Patent [19]
Uhling

[11] Patent Number: 5,984,193
[45] Date of Patent: Nov. 16, 1999

[54] PRINTER MEDIA WITH BAR CODE IDENTIFICATION SYSTEM

[75] Inventor: Thomas F Uhling, Vancouver, Wash.

[73] Assignee: Hewlett-Parkard Company, Palo Alto, Calif.

[21] Appl. No.: 09/034,787

[22] Filed: Mar. 4, 1998

[51] Int. Cl.[6] .................................................. G06K 19/06
[52] U.S. Cl. .......................... 235/494; 235/262; 235/432; 235/454
[58] Field of Search ................................... 235/494, 262, 235/491, 432, 454

[56] References Cited

U.S. PATENT DOCUMENTS

| | | | |
|---|---|---|---|
| 4,467,207 | 8/1984 | Lerner et al. | 250/459.1 |
| 4,680,205 | 7/1987 | Lerner et al. | 428/29 |
| 4,716,438 | 12/1987 | Farrell | 355/6 |
| 4,768,410 | 9/1988 | Wood | 83/63 |
| 4,818,850 | 4/1989 | Gombrich et al. | 235/494 |
| 4,924,078 | 5/1990 | Sant'Anselmo et al. | 235/494 |
| 5,005,873 | 4/1991 | West | 283/92 |
| 5,023,437 | 6/1991 | Speicher | 235/432 |
| 5,051,779 | 9/1991 | Hikawa | 355/200 |
| 5,128,528 | 7/1992 | Heninger | 235/470 |
| 5,184,003 | 2/1993 | McMillan et al. | 235/454 |
| 5,380,998 | 1/1995 | Bossen et al. | 235/463 |
| 5,503,904 | 4/1996 | Yoshinaga et al. | 428/195 |

*Primary Examiner*—Donald Hajec
*Assistant Examiner*—Daniel Felten

[57] ABSTRACT

A bi-directionally scannable bar code pattern having a parallel array of alternating lines and spaces, each having selected widths. Each line has a common series of segments and segment spaces of selected lengths. The length of each segment may be the same as the width of a corresponding line, and the length of each segment space may be the same as the width of a corresponding space between lines. The pattern may be printed on a sheet of printer media, or on a strip attached to such a sheet.

19 Claims, 3 Drawing Sheets

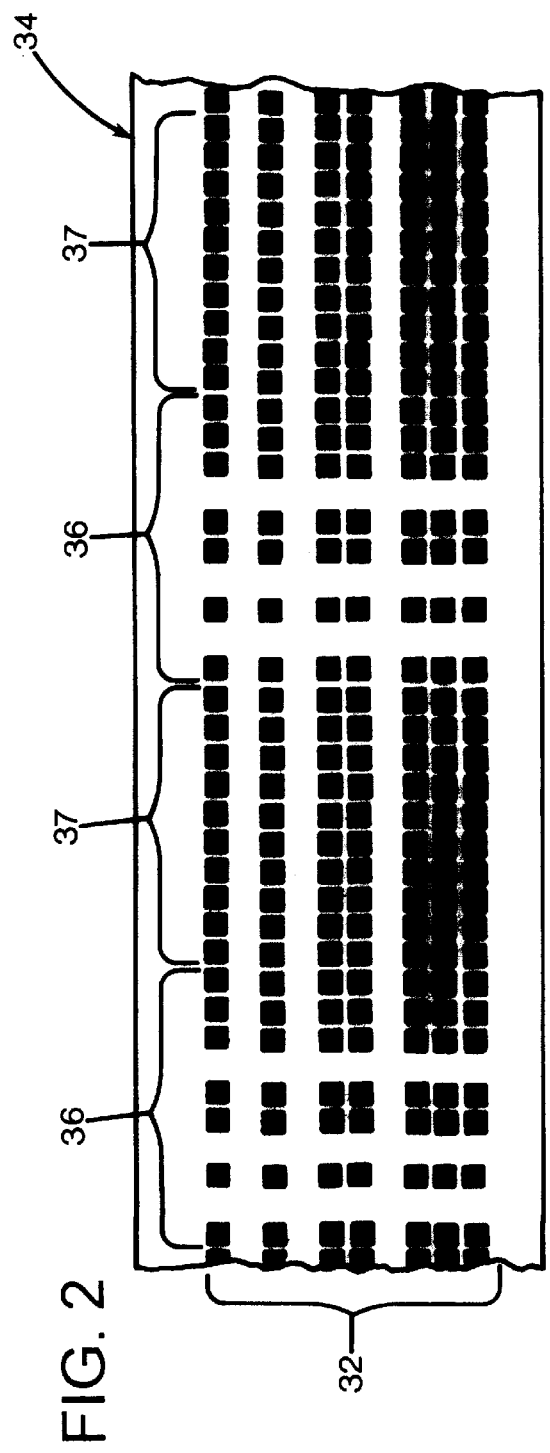
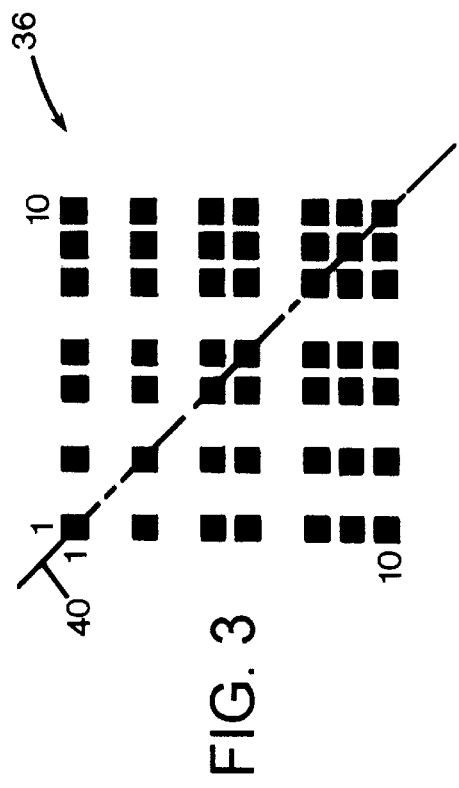
FIG. 3
FIG. 2

PRINTER MEDIA WITH BAR CODE IDENTIFICATION SYSTEM

FIELD OF THE INVENTION

This invention relates to printer media and computer printers, and more particularly to printed indicia for automatic identification of media by a printer.

BACKGROUND OF THE INVENTION

Computer printers such as ink jet printers often use different printing techniques for different types of printer media, such as conventional paper, specialized ink jet paper, coated paper, and transparencies. Depending of the media characteristics, different printing algorithms are used to prevent undesirable image characteristics such as color ink bleed, which varies with media type.

In addition, a given printer may be used for printing on different sizes of media. In such cases, it is helpful for the image printed to be sized to fit the media. This avoids images bleeding off the sheet edge, requiring two sheets, or failing to fill the full sheet area if desired. Also, dual sided or duplex printing requires careful manual reloading of the media supply during the printing process, with errors frequently occurring due to misorienting the media stack.

While paper size, type, and orientation may be properly established and manually entered into the printer memory or connected computer by an alert user, it is desirable to automate such tasks to simplify operation and to avoid likely errors. Existing media has been provided with bar coded identifying data for scanning by a printer. Such bar codes are typically provided at the corner margins of sheets on both sides, and are printed in a normally invisible fluorescent ink. The bar code ink fluoresces at an infrared wavelength in response to illumination by a red emitter in the printer, and is read by an optical scanner in the printer.

A typical printer drives paper along a feed axis, and has a print head carriage reciprocating over the paper along a perpendicular scan axis. In some printers, the bar code sensor is stationary, and mounted to the printer chassis at the edge of the paper path. Such fixed sensors may be readily shielded from exterior light, and may read a bar code as the paper is initially fed along the feed axis before the carriage begins to reciprocate. The lines of the bar code on the paper must be oriented perpendicular to the feed axis for use with a fixed sensor. In other printers, the sensor is mounted on the carriage, so that it may also perform other sensing functions such as media edge detection and ink color registration procedures. For carriage mounted sensors, the bar code lines on the media sheet must be oriented perpendicular to the scan axis. Bar coded media for one type of printer sensor is not necessarily compatible with the other type of sensor, requiring inventory of two media code types, and possible user confusion.

Transparencies present an additional challenge, as they are unsuitable for printing invisible bar codes. A paper strip may be attached to a margin of the film for printing indicia, but such a sheet will be limited for use only with a given type of printer sensor.

The present invention overcomes the limitations of the prior art by providing a bi-directionally scannable bar code pattern having a parallel array of alternating lines and spaces, each having selected widths. Each line has a common series of segments and segment spaces of selected lengths. The length of each segment may be the same as the width of a corresponding line, and the length of each segment space may be the same as the width of a corresponding space between lines. The pattern may be printed on a sheet of printer media, or on a strip attached to such a sheet.

BRIEF DESCRIPTION OF THE DRAWINGS

FIG. 2 is a plan view of a strip printed with a set of coded graphical element according to the embodiment of FIG. 1.

FIG. 3 is a plan view of a coded graphical element according to the embodiment of FIG. 1.

DETAILED DESCRIPTION OF A PREFERRED EMBODIMENT

Figure 1:
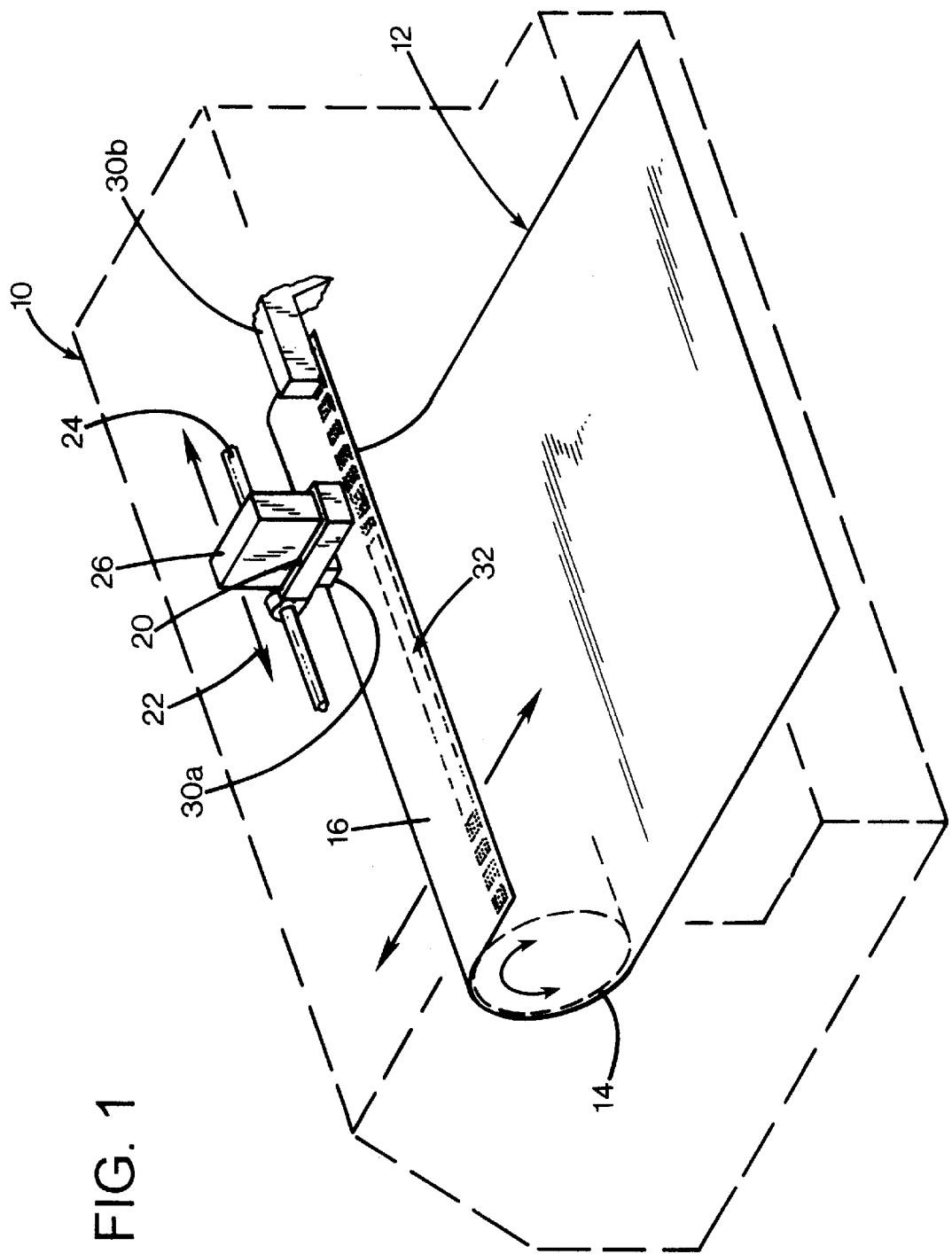
FIG. 1 is a simplified perspective view of a media sheet according to a preferred embodiment of the invention as received in a printer.

FIG. 1 shows a computer printer 10 into which a sheet of printer media 12 has been loaded. The printer has a media drive mechanism 14 that feeds the sheet along a paper path, with motion of the sheet defining a feed axis 16. A print head carriage 20 reciprocates along a scan axis 22 on a guide rod 24, and carries a print cartridge 26 that expels ink droplets onto the media surface. The scan axis is perpendicular to the feed axis. The printer includes a carriage-mounted optical sensor 30a or a fixed optical sensor 30b mounted to the printer frame. Either optical sensor is positioned to read conventional bar codes.

A carriage mounted sensor 30a has fine resolution along the scan axis to read bar code symbols with lines oriented perpendicular to the scan axis. The motion of the carriage moves the sensor across the bar code lines to read the code. A fixed sensor 30b is positioned near the edge of the media path, and overhangs the media to read a bar code along the side edge of the media. With fine resolution along the feed axis, the sensor reads bar code symbols having lines oriented perpendicular to the feed axis as the media sheet moves relative to the sensor.

Regardless of sensor position, the sensor may be of any type suitable for reading a bar code, such as one that illuminates or detects a small spot, or one that illuminates or detects a narrow line parallel to the lines of a conventional bar code. In the preferred embodiment, the sensor provides illumination and sensing to detect patterns printed on the media in "invisible ink" that fluoresces in the infrared in response to illumination with a red emitter. Alternative invisible inks may be used, as may visible inks or other detectable characteristics.

While the printer sensor may be of different alternative configurations, the media sheet 12 is encoded with a pattern 32 that may be detected by either type of sensor, and regardless of orientation of the sheet. The pattern is an elongated stripe that extends along the length of the leading edge of the sheet. In alternative embodiments, the pattern may be printed on some or all sheet edges, on one or both faces of the sheet, or at selected marginal positions on the sheet, such as at the corners. The pattern may be formed of a multitude of identical elements so that the same information is read by a sensor reading any portion of the sheet. Alternatively, the pattern may have different patterns printed to different portions of the sheet, to distinguish between faces of the sheet, or between leading and trailing edges, to ensure proper semi-manual duplex printing.

FIG. 2 shows details of the pattern 32 as printed at the edge of a media sheet or strip 34. For paper media, the pattern is printed directly on the media; for transparent media, the pattern is printed on a paper strip attached to an edge of the transparency. The pattern includes a repeating linear array of closely spaced pattern elements or sub-elements or tiles 36 alternating with separator elements 37. The pattern elements abut each other and are registered in a straight line parallel to the edge of the sheet or strip. The tiles 36 have bidirectional bar codes, as will be discussed below, while the separator elements 37 have bar code lines only in complete rows parallel to the length of the pattern 32, in the manner of a conventional bar code.

Accordingly, a carriage mounted scanner will be able to identify the beginning of the tile code pattern by detecting the unprinted columns following a section of identical columns. In the illustrated instance, the tile code begins with an initial "1,0" identifier, although other patterns may be used. A fixed sensor will read the separator tiles 37 just as readily as the bi-directionally coded tiles 36, so that registration of the pattern 32 with the sensor is not required.

FIG. 3 shows a single tile 36, which contains an encoded value that is scannable in either orthogonal direction. In the illustrated embodiment, the tile is a 10 by 10 matrix of square pixels. Although illustrated with spaces between the pixels for clarity, the pixels preferably abut each other. Each pixel may either be unprinted for a "0" value, or printed for a "1" value. Each row and column has either all unprinted pixels, or a common sequence of selectably printed and unprinted pixels corresponding to the encoded value, in this case "1,0,1,0,1,1,0,1,1,1". As a consequence of this requirement, a row or column remains entirely unprinted if its ordinal position corresponds to a "0" in the encoded sequence. The encoding algorithm may also be expressed as a requirement that a pixel be printed only if its column and row ordinal positions both correspond to a "1" value on the encoded sequence. Because the rows and columns are subject to the same encoding rules, the pattern is symmetrical about a diagonal axis 40 that connects pixel (1,1) to pixel (10,10). The rows (or columns) having the sequence of printed and unprinted pixels are considered as "first portions" of the pattern sub-element, and the unprinted rows (or columnns) are considered as "second portions" of the pattern sub-element. The printed pixels of the first portions are considered as "first segments" and the unprinted pixels of the first portions are considered as "second segments".

Each printed column is said to be a printed line, and is read as such by a conventional slit sensor, even though the line is broken into a series of line segments, some of which may be single pixel dots. The unprinted columns and rows are considered as unprinted lines. The pattern element or tile is shown as a matrix with pixels on a uniform pitch, providing line or line segment widths at an integral multiple of the pitch. Alternatively, the widths and spaces may be varied over a range of detectable values to encode more information, in the manner of a conventional bar code. In any case, the pattern element is the conceptual equivalent to printing two identical bar code patterns overlaying each other, with a 90 degree offset, and removing all printing except where printed by both patterns. Another conceptual equivalent is starting with a fully printed tile, and removing stripes where spaces are desired, for each direction. In an alternative embodiment, the tile may be generated with each pixel being printed if either its row or column or both have a value of "1". Instead of dots and dashes on an unprinted field, the pattern may be a solid printed block perforated by unprinted dots and dashes. This approach is less desirable because an average tile will be about 75% printed, instead of the 25% printed tiles of the illustrated embodiment.

In alternative embodiments, each tile may be printed with a different code in different axes. One embodiment of this might include the same paper size code in each direction, but a different orientation indicator for the printer controller to determine how the media has been installed. The tiles need not be square, and may be rectangular, with line and space widths proportional to, but not necessarily equal to each other.

Figure 4:
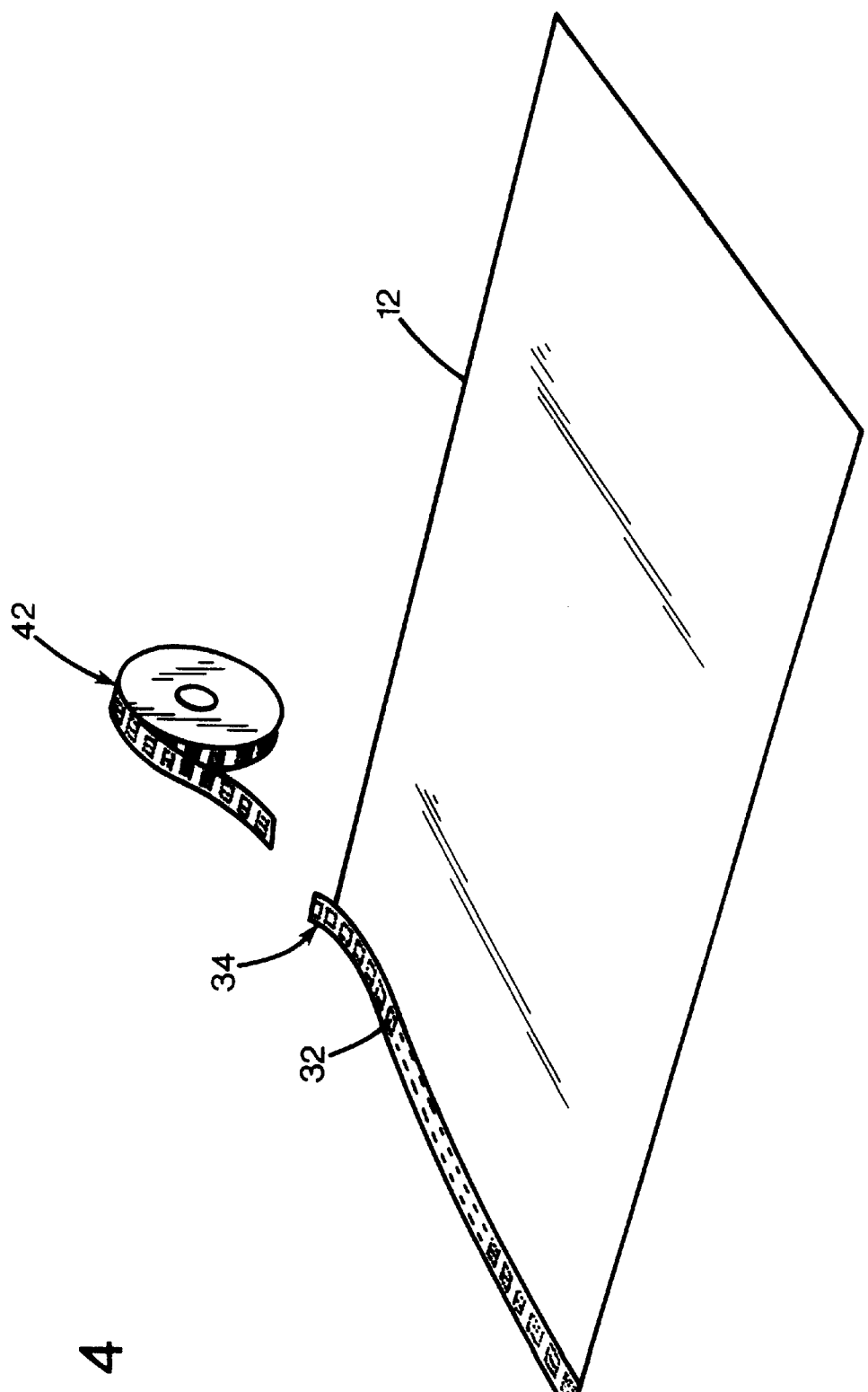
FIG. 4 is a perspective view of a transparency media sheet with a coded strip according to the embodiment of FIG. 1.

In FIG. 4, the media 12 is a transparency film with the patterned strip 34 adhered at one edge. The strip is continuously printed with the pattern 32, and may be drawn from a continuously printed strip roll 42 having a length adequate to provide strips for a multitude of sheets. The disclosed pattern is well suited to this method of preparing media because registration of the pattern is not required. Elongated tapes are likely to experience linear dimensional variations that accumulate over a lengthy roll, making precise cutting and registration impractical. A printer that scans the strip across the length of the strip (such as in a fixed sensor printer) will be entirely insensitive to the position of the strip; a carriage mounted scanner will proceed until it finds the first or any complete pattern element. A partial pattern element resulting from imprecise cutting or misalignment will have no harmful effect.

The pattern is intended for any printer with a slit type sensor that detects a region preferably less than or equal to one pixel wide, at least two pixels long if the pattern algorithm is limited to no more than one consecutive "0" value, and longer if consecutive zeros are tolerated. However, the pattern may also be scanned by a round or square spot sufficiently larger than the widest possible swath of unprinted "0" values to ensure that a spot centered on the swath will detect the adjacent printed lines to determine their printed and unprinted line segments.

While the above is discussed in terms of preferred and alternative embodiments, the invention is not intended to be so limited. For instance, the pattern is discussed in terms of printed and unprinted portions, these terms are used for illustration only. Any selectable characteristic detectable by a sensor may be used. Printed ink having different reflectance or emission characteristics is the preferred embodiment (with the black portions of the illustrations representing more emissive fluorescent ink). Alternatives may include media texture, contour, electrical charge, magnetic characteristics, or any other detectable value. In any embodiment, the characteristic representing a "1" value and that representing a "0" value may be switched, so those areas described as "printed" may in fact be bare media, while that described as "unprinted" has a substance applied, or distinct characteristic relative to the media surface.

I claim:

1. A bi-directionally linearly scannable bar code pattern comprising:

a parallel array of alternating elongated first portions and second portions;

each of the first portions having a first optical characteristic, and each of the second portions having a distinct second optical characteristic;

each of the first portions and each of the second portions having a respective selected width selected from a range of different widths;

each of the first portions comprising an elongated bar having a common series of alternating first segments and second segments;

each of the first segments having the first optical characteristic, and each of the second segments having the second optical characteristic;

each of the first segments and each of the second segments having a selected length;

the length of each first segment in the series being equal to the width of a corresponding first portion at a corresponding place in the array;

the length of each second segment in the series being equal to the width of a corresponding second portion at a corresponding place in the array; and a substrate having an edge, including multiple instances of the pattern printed along the edge of the substrate, wherein the first segments of the first portions comprise printed portions of the substrate, and wherein the second portions and second segments comprise unprinted portions of the substrate.

2. The pattern of claim 1 wherein each sub-element is symmetrical about a diagonal axis.

3. The pattern of claim 1 wherein at least one of the first optical characteristic and the second optical characteristic is fluorescence.

4. The pattern of claim 1 including a substrate, and wherein the first segments of the first portions comprise printed portions of the substrate, and wherein the second portions and second segments comprise unprinted portions of the substrate.

5. The pattern of claim 4 printed along an edge of the substrate.

6. The pattern of claim 4 wherein the substrate is an elongated strip, and wherein multiple instances of the pattern are printed along the strip.

7. The pattern of claim 6 including a transparency sheet attached to the strip.

8. The pattern of claim 1 wherein the sub-elements abut each other.

9. The pattern of claim 1 wherein the sub-elements are arranged in a linear array.

10. The pattern of claim 1 wherein the sub-elements are oriented in a common orientation.

11. A bi-directionally scannable bar code pattern comprising:

a parallel array of alternating elongated first portions and second portions;

each of the first portions having a first optical characteristic, and each of the second portions having a distinct second optical characteristic;

each of the first portions and each of the second portions having a respective selected width selected from a range of widths;

each of the first portions comprising an elongated bar having a common series of alternating first segments and second segments;

each of the first segments having the first optical characteristic, and each of the second segments having the second optical characteristic;

each of the first segments and each of the second segments having a selected length;

the length of each first segment in the series being equal to the width of a corresponding first portion at a corresponding place in the array;

the length of each second segment in the series being equal to the width of a corresponding second portion at a corresponding place in the array; and a substrate having an edge, including multiple instances of the pattern printed along the edge of the substrate, wherein the first segments of the first portions comprise printed portions of the substrate, and wherein the second portions and second segments comprise unprinted portions of the substrate.

12. The pattern of claim 11 wherein the pattern is symmetrical about a diagonal axis.

13. The pattern of claim 11 wherein at least one of the first optical characteristic and the second optical characteristic is fluorescence.

14. The pattern of claim 11 wherein the substrate is an elongated strip, and wherein multiple instances of the pattern are printed along the strip.

15. The pattern of claim 14 printed along an edge of the substrate.

16. The pattern of claim 15 including a transparency sheet attached to the strip.

17. The pattern of claim 11 wherein the sub-elements abut each other.

18. The pattern of claim 11 wherein the sub-elements are arranged in a linear array.

19. The pattern of claim 11 wherein the sub-elements are oriented in a common orientation.

* * * * *

UNITED STATES PATENT AND TRADEMARK OFFICE
CERTIFICATE OF CORRECTION

PATENT NO. : 5,984,193
DATED : November 16, 1999
INVENTOR(S) : Uhling

It is certified that error appears in the above-identified patent and that said Letters Patent is hereby corrected as shown below:

On the Title Page
In the "Assignee" Section, delete "Hewlett-Parkard" and insert therefor --Hewlett-Packard--.

In the Specification
Column 3
Line 4, delete "or" and insert therefor --,--.
Line 8, delete "bidirectional" and insert therefor --bi-directional--.
Line 39, delete "arc" and insert therefor --are--.

In the Claims
Column 4
Line 52, after "pattern", insert --having a plurality of bar code sub-elements, each sub element--.

Column 5
Line 39, after "bi-directionally" insert --linearly--.

Column 6
Line 3, after "of", insert --different--.

Signed and Sealed this

Nineteenth Day of June, 2001

Attest:

NICHOLAS P. GODICI
Attesting Officer
Acting Director of the United States Patent and Trademark Office